United States Patent
Pham et al.

(10) Patent No.: US 11,853,431 B2
(45) Date of Patent: *Dec. 26, 2023

(54) USE OF WORD EMBEDDINGS TO LOCATE SENSITIVE TEXT IN COMPUTER PROGRAMMING SCRIPTS

(71) Applicant: Capital One Services, LLC, McLean, VA (US)

(72) Inventors: Vincent Pham, Champaign, IL (US); Kenneth Taylor, Champaign, IL (US); Jeremy Edward Goodsitt, Champaign, IL (US); Fardin Abdi Taghi Abad, Champaign, IL (US); Austin Grant Walters, Savoy, IL (US); Reza Farivar, Champaign, IL (US); Anh Truong, Champaign, IL (US); Mark Louis Watson, Sedona, AZ (US)

(73) Assignee: Capital One Services, LLC, McLean, VA (US)

( * ) Notice: Subject to any disclaimer, the term of this patent is extended or adjusted under 35 U.S.C. 154(b) by 605 days.

This patent is subject to a terminal disclaimer.

(21) Appl. No.: 16/992,371

(22) Filed: Aug. 13, 2020

(65) Prior Publication Data

US 2021/0192054 A1 Jun. 24, 2021

Related U.S. Application Data (63) Continuation of application No. 16/722,867, filed on Dec. 20, 2019, now Pat. No. 10,783,257.

(51) Int. Cl.
*G06F 21/57* (2013.01)
*G06N 3/08* (2023.01)
*G06F 21/31* (2013.01)
*G06N 3/04* (2023.01)

(52) U.S. Cl.
CPC ............ *G06F 21/577* (2013.01); *G06F 21/31* (2013.01); *G06N 3/04* (2013.01); *G06N 3/08* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,984,062 B1* | 5/2018 | Strope | G06F 16/31 |
| 2019/0286440 A1* | 9/2019 | Leonard | G06F 8/60 |
| 2020/0019614 A1* | 1/2020 | Kumar | H04L 67/561 |
| 2020/0042613 A1* | 2/2020 | Jiang | G06N 3/08 |
| 2020/0057936 A1* | 2/2020 | Haeusser | G06N 3/08 |

* cited by examiner

*Primary Examiner* — Fatoumata Traore
(74) *Attorney, Agent, or Firm* — KDW Firm PLLC (57) ABSTRACT

Exemplary embodiments may use word embeddings to enhance scanning of programming code scripts for sensitive subject matter, such as confidential subject matter. The scanning may be performed by a neural network in some exemplary embodiments. The neural network initially may be trained on a corpus of programming code scripts to identify keywords relating to sensitive subject matter, such as passwords, tokens or credentials. The neural network may not only identify instances of the keywords but also may identify related terms as well. The output of the scan may be a ranked list of terms in the programming code script that may relate to sensitive subject matter.

20 Claims, 11 Drawing Sheets

USE OF WORD EMBEDDINGS TO LOCATE SENSITIVE TEXT IN COMPUTER PROGRAMMING SCRIPTS

RELATED APPLICATIONS

This application is a continuation of U.S. patent application Ser. No. 16/722,867, filed Dec. 20, 2019, titled "USE OF WORD EMBEDDINGS TO LOCATE SENSITIVE TEXT IN COMPUTER PROGRAMMING SCRIPTS". The contents of the aforementioned application are incorporated herein by reference in their entirety.

BACKGROUND

Programming code scripts may contain sensitive information. For example, a programming code script may specify a password for a user or a program. When the programming code script is output on a printout or on a video display the sensitive information becomes visible to a viewer. Oftentimes, the programmer or information technology representative to which the programming code scripts is visible should not have access to the sensitive information contained therein. One of the problems in policing such programming code scripts for such sensitive information is the sheer volume of programming code scripts. Many organizations have a large number of servers and/or code repositories. Manual inspection of each programming code script on the servers or repositories is truly onerous. Moreover, the code base is dynamic such that large portions may be changed or added on an ongoing basis.

SUMMARY

In accordance with an exemplary embodiment, a computer-implemented method is performed. In this method, a neural network is trained on a corpus of programming code scripts. The training results in word embeddings for words in the corpus. Each of the word embeddings is a numeric vector in a vector or matrix space. An initial word of interest is identified. A vector that encodes the initial word of interest in the vector or matrix space is identified. Vectors in the vector or matrix space that lie in a specified proximity to the vector for the initial word of interest are identified, and words encoded by the identified vectors are identified as additional words of interest. A security scan of a set of programming code scripts is performed to identify instances of the initial word of interest and instances of the additional words of interest in the set of programming code scripts. Output is generated that specifies the identified instances of the initial word of instance and instances of the additional words of interest in the set of programming code scripts.

The initial word of interest may relate to sensitive content whose access is limited to authorized parties. In some embodiments, the corpus may contain content from programming code scripts stored in multiple code repositories. The identifying vectors in the vector or matrix space in the specified proximity to the vector for the initial word of interest may comprise calculating distances between the vector of the initial word of interest and vectors for other encoded words in the vector or matrix space. The output may include a ranked probability that the initial word of interest and additional words of interest instances relate to sensitive information. The identifying vectors in the vector or matrix space may comprise calculating cosine values between the vector that encodes the initial word of interest and the vectors in the vector or matrix space and identifying ones of the vectors in the vector or matrix space that have cosine values within a specified range as being in the specified proximity. The output may produce ranked probabilities that the additional words of interest relate to sensitive content. The security scan may be performed by the neural network. Text of the set of programming code scripts may be input to the neural network.

In accordance with an exemplary embodiment, a method is performed where a neural network is trained on a corpus of programming code scripts. The training results in word embeddings for words in the corpus. Each of the word embeddings is a numeric vector in a vector or matrix space. A selected programming code script that is input to the trained neural network is processed with the neural network by performing the following. A word embedding is identified in the vector or matrix space for a word that is indicative of a password being in the selected programming code script. Distance metrics are calculated for distances between the identified word embedding and word embeddings having vectors in proximity to the identified word embedding. Based on the calculated distance metrics, a probability for each of multiple words having word embeddings in proximity to the identified word embedding is generated. The probability is a probability that the word is indicative of a password. A subset of the multiple words that have a probability that exceeds a threshold is identified, and an output that identifies the identified subset is generated.

The output may identify the words in the subset and provide the generated probability for the words in the subset. The selected programming script may be input to the neural network a word at a time. In other instances, the selected programming script is input an n-gram at a time, where n is an integer greater than or equal to 2. The calculating the distance metrics may comprise calculating linear distance or calculating cosine distance.

In accordance with an exemplary embodiment, a non-transitory computer-readable storage medium stores instructions that cause a processor to perform the following. Words from one or more programming code scripts are input to a trained neural network. With the trained neural network, word embeddings are determined for the input words. Each word embedding is a vector in a vector or matrix space. Proximity in the vector or matrix space between the word embeddings of input words and the word embeddings of known words of interest is computed. Based on the computed proximity, probabilities for at least some of the input words that the input words are of interest are determined, and a ranked list of the determined probabilities for at least some of the input words is output.

Only probabilities over a threshold may be output as part of the outputting in some embodiments. The computing proximity may comprise calculating distance in the vector or matrix space between the input words and the word embeddings of the known words of interest. The known words of interest may relate to confidential subject matter. In some embodiments, the keywords are at least one of passwords, tokens or credentials.

DETAILED DESCRIPTION

Exemplary embodiments described herein seek to address some of the shortcomings of conventional techniques for manually reviewing programming code scripts for sensitive text. The exemplary embodiments may use word embeddings to enhance scanning of programming code scripts for sensitive subject matter, such as confidential subject matter. The scanning may be performed by a neural network in some exemplary embodiments. The neural network initially may be trained on a corpus of programming code scripts to identify keywords relating to sensitive subject matter, such as passwords, tokens or credentials. The neural network may not only identify instances of the keywords but also may identify related terms as well. The output of the scan may be a ranked list of terms in the programming code script that may relate to sensitive subject matter. Alternatively, the word embeddings alone may be used to identify words related to the keywords to identify in the scan.

The processing by the neural network may identify both keywords and terms related to the keywords. The terms related to the keywords may be identified with word embeddings. Proximity in a vector or matrix space of the word embeddings for two terms may indicate that terms are related. Proximity may be measured by linear distance, cosine distance, or the like.

Figure 1:
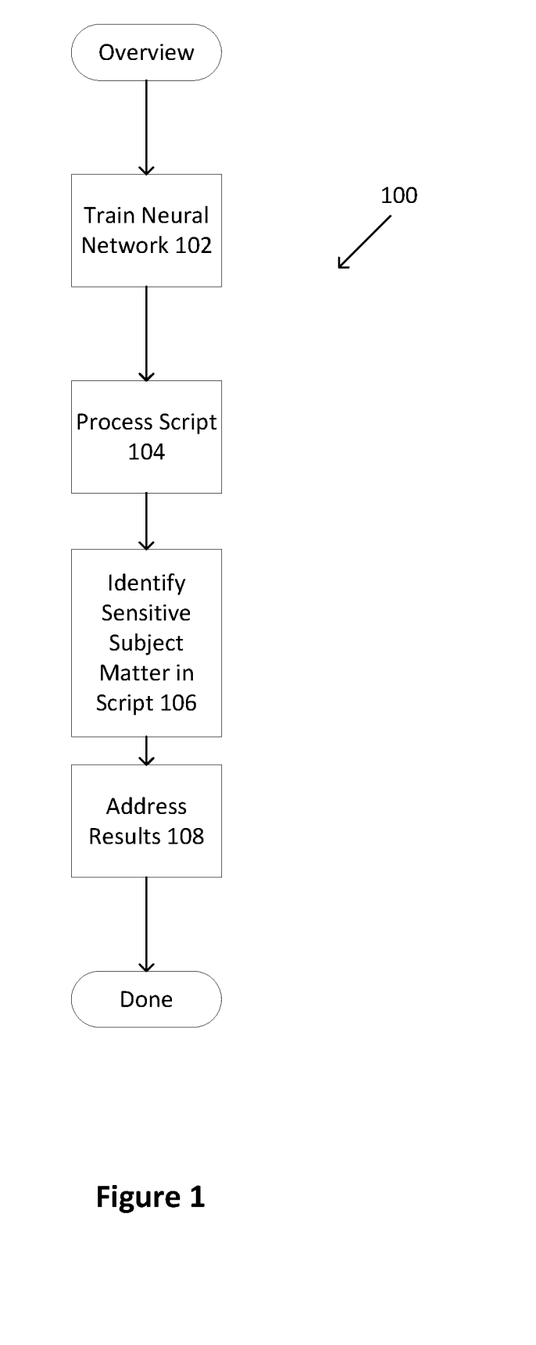
FIG. 1 depicts a flowchart showing illustrative steps that may be performed to use word embeddings to scan computer scripts in an exemplary embodiment.

FIG. 1 depicts a flowchart 100 of steps that may be performed in an exemplary embodiment. Initially a neural network is trained (102). The neural network may be, in some instances, a shallow neural network having an input layer, an output layer and an intermediate layer or a deep learning model with many layers. The output of the neural network is the same as the input. Thus, if the word "dog" is input, the output is dog. The word embeddings are in the intermediate layer of the network. The training of the neural network will be described in more detail below. After the neural network is trained, a programming code script may be processed using the word embeddings (104). The embeddings may be used to find the proximity to known sensitive text. Alternatively, the word embeddings may be fed into a secondary neural network to predict whether a word is likely to be sensitive or not is determined. The processing will be described in more detail below.

The programming code script is a listing of the computer programming code available on a server or in a repository. It may contain high level programming code, such as Java, C++, C or Python, or may contain lower level programming code, such as an assembly language listing. The programming code script should be of the type that potentially sensitive information may be included in it. Examples of sensitive information include things like passwords, tokens, credentials, confidential personal information, classified information that should not be readily available for perusal by a casual observer. The processing by the neural network aims to identify keywords that may identify sections of the programming code script that contain sensitive information. For instance, if the programming code script contains "password", there likely may be text that follows that contains a password. The neural network also identifies additional terms that are related to the keywords in the programming code script.

The next step in the process is to identify potentially sensitive subject matter in the programming code script (106). The analysis can identify portions of the programming code script that are problematic and that require remediation. The analysis may be done manually or programmatically. As was mentioned above, the keywords and related words may be used to identify possibly sensitive subject matter. In one instance, the word embeddings are directly used. In another, the word embeddings are fed to a secondary neural network and used on the input programming code script. The processing by the secondary neural network produces an output. The output may identify occurrences of the keywords and the related terms in the programming code script. In some instances, the output may be a ranked list of terms that are ranked by the likelihood that they are indicative of sensitive subject matter in the programming code script.

In the final step, the remediation is performed to address the results (108). The remediation may entail obfuscating the sensitive information in the programming code script or removing the sensitive information from the programming code script by editing or other revision process.

Figure 2:
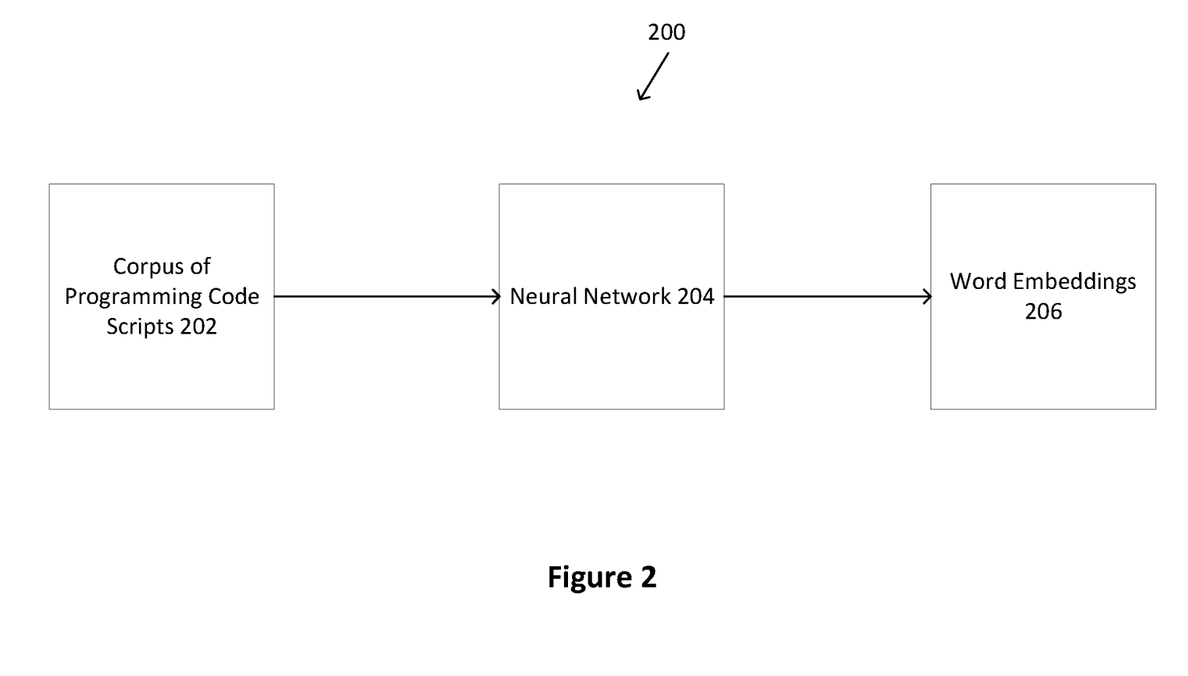
FIG. 2 depicts a block diagram showing the training of a neural network with a corpus of programming code scripts to produce word embeddings.
Figure 3:
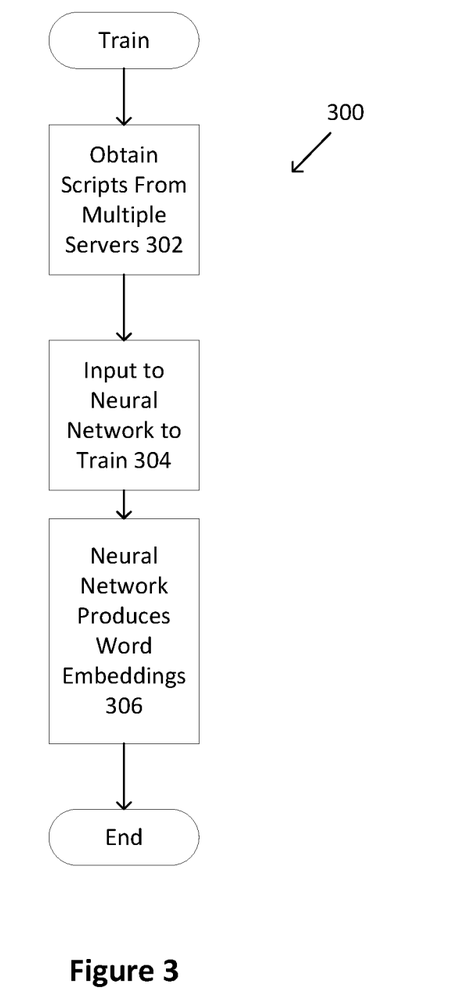
FIG. 3 depicts a flowchart of illustrative steps that may be performed to train a neural network.

The training will be described below with reference to FIGS. 2 and 3. FIG. 2 shows a block diagram 200 depicting the flow of inputs and outputs relative to the neural network during training. FIG. 3 shows a flowchart of steps performed in training the neural network. A corpus of programming code scripts 202 may be gathered from multiple servers (302) and may be input to the neural network 204 to train the neural network 204 (304). The corpus 202 should contain a large sample of programming code scripts that have a variety of content. Hence, it may be desirable to gather from multiple servers and/or repositories. The aim is to provide a large sample sized that is varied so that the neural network encounters a large number of instances of sensitive subject matter in different forms. That way there is a greater likelihood that the neural network will produce correct and useful output when it encounters a wide variety of programming code scripts having different syntaxes and patterns. Ideally, the neural network 204 adapts to each programming code script it encounters to learn how to better identify sensitive subject matter in a programming code script. The neural network produces word embeddings 206 for the words contained in the programming code scripts of the corpus (306). Each word embedding is encoding of the associated word in a vector or matrix space. Each word embedding is a vector that uniquely identifies the word in the vector or matrix space. The encoding is such that related words are located in proximity to each other in the vector or matrix space. This proximity is leveraged to identify words related to keywords as will be described below. N-grams (i.e., groups of n adjacent words, where n is a positive integer) of two or more words may be input rather than solely single words. Currently available models and tools for producing word embeddings, like Word2Vec and GloVe may be used to produce the word embeddings.

Figure 4:
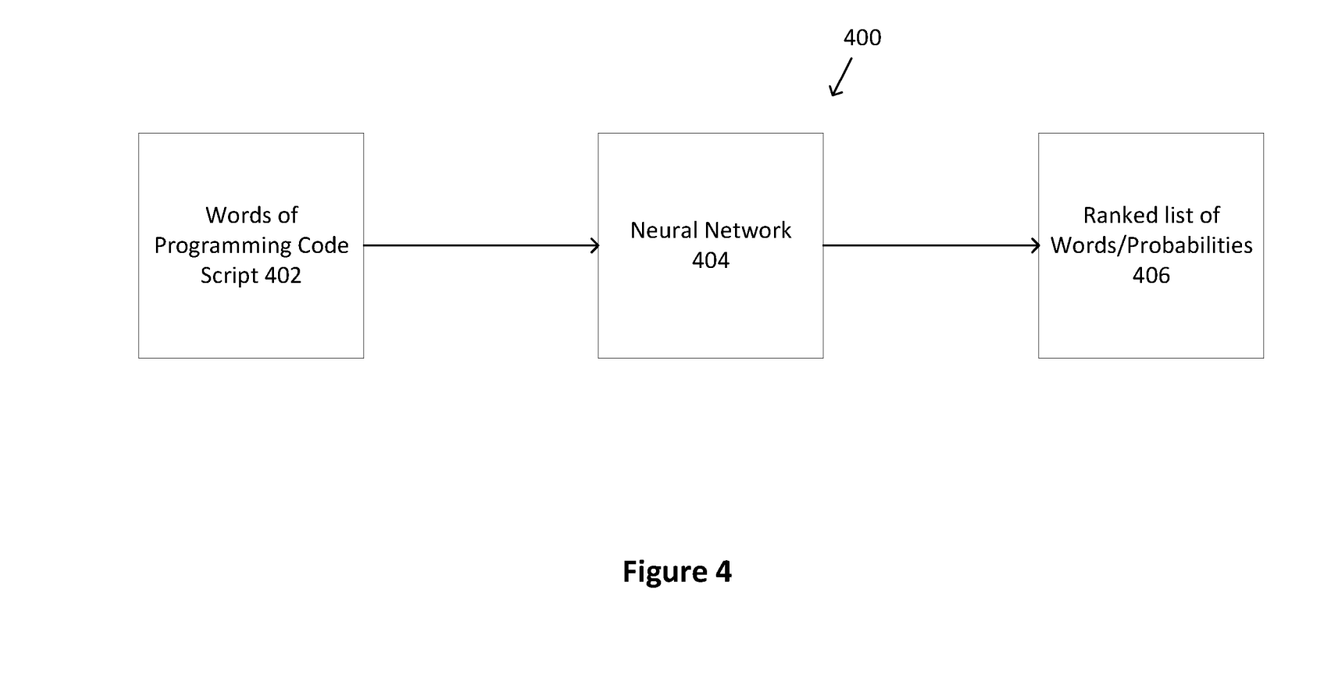
FIG. 4 depicts a block diagram of the processing of a programming code script by a trained neural network.
Figure 5A:
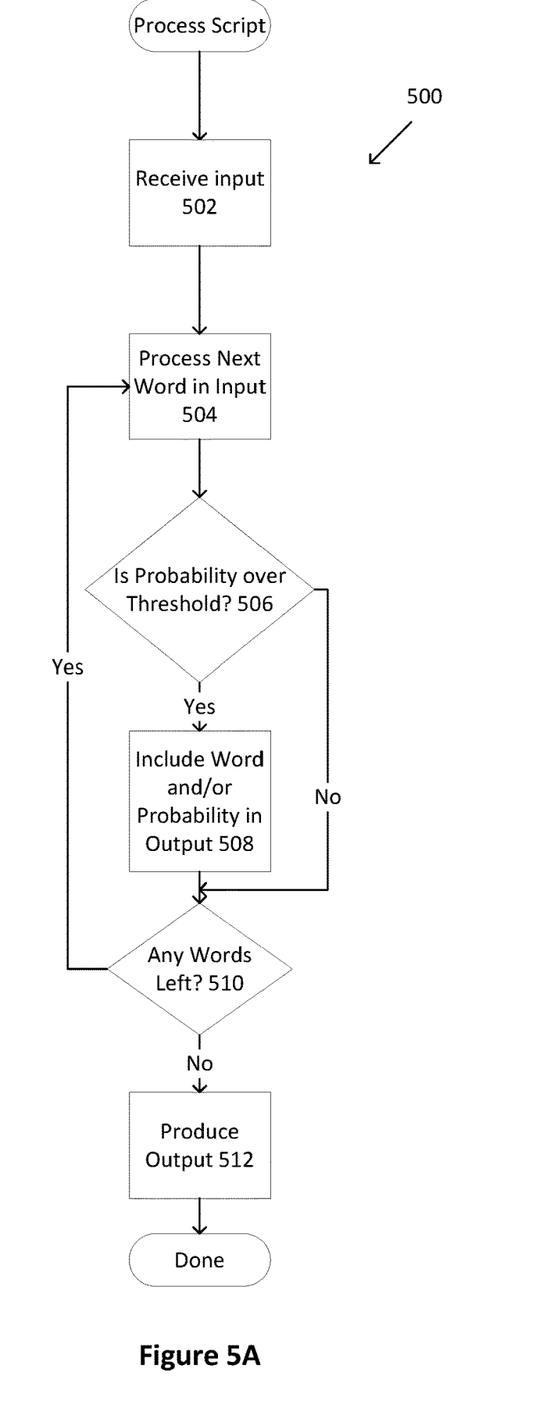
FIG. 5A depicts a flowchart illustrating steps that may be performed in processing a programming code script.

As was discussed above, once the neural network has been trained on a corpus of programming language scripts, the neural network may be used to process programming code scripts. FIG. 4 depicts a block diagram 400 illustrating the use of the neural network to perform such an analysis. A programming code script 402 on a server and/or on a repository is input into the neural network 404. The neural network 404 processes the programming code script and produces an output 406 that is a ranked list of words and probabilities for those words. In some cases, n-grams may be used instead of individual words. This list ranks terms in the programming language script 402 that are of closest proximity to known sensitive terms. Where the secondary neural network is used, each probability reflects how likely a word is to be a sensitive term given its embedding FIG. 5A depicts a flowchart 500 of illustrative steps that may be performed in processing a programming code script. Initially, a programming code script is received (502). The content of the programming code script may be parsed into words and fed into the neural network one word at a time (504). The neural network may perform the steps shown in the flowchart 520 of FIG. 5B for each word.

Figure 5B:
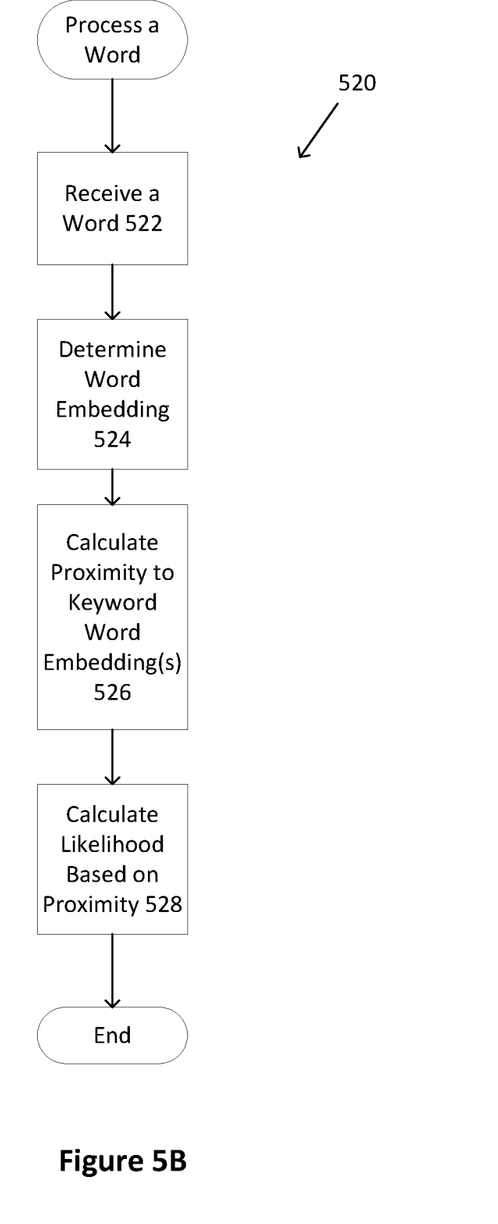
FIG. 5B depicts a flowchart of illustrative steps that may be performed to process a word of a programming code script with the neural network.

Initially, as shown in FIG. 5B, the word is received (522) by the neural network. The neural network determines a word embedding for the received word (524). Because the word embeddings are generated such that related words are assigned word embeddings close to each other in the vectors/matrix space for words, the proximity among words may be used to identify related words. Thus, in 526, the proximity to keywords to the word embedding for the received word is determined. This may entail calculation of linear distance, cosine distance, cosine or other metric of proximity. The likelihood that the word is a sensitive text is identified. (528).

With reference again to FIG. 5A, once the probability for the word has been calculated, a check may be made whether the probability for the word exceeds a threshold (506). If the probability exceeds the threshold the word may be added to an output that may list words of interest and their associated probabilities (508). If the probability is not over the threshold, it may be excluded from the output. The output may be a sorted list that is sorted by probabilities. In other embodiments, the output may just be a list of words of interest or a simply a list of keywords and related words. A check is made whether any words remain to be processed (510). If not, the output is produced (512). If there are more words to be processed, the steps are repeated beginning with step (504).

Figure 5C:
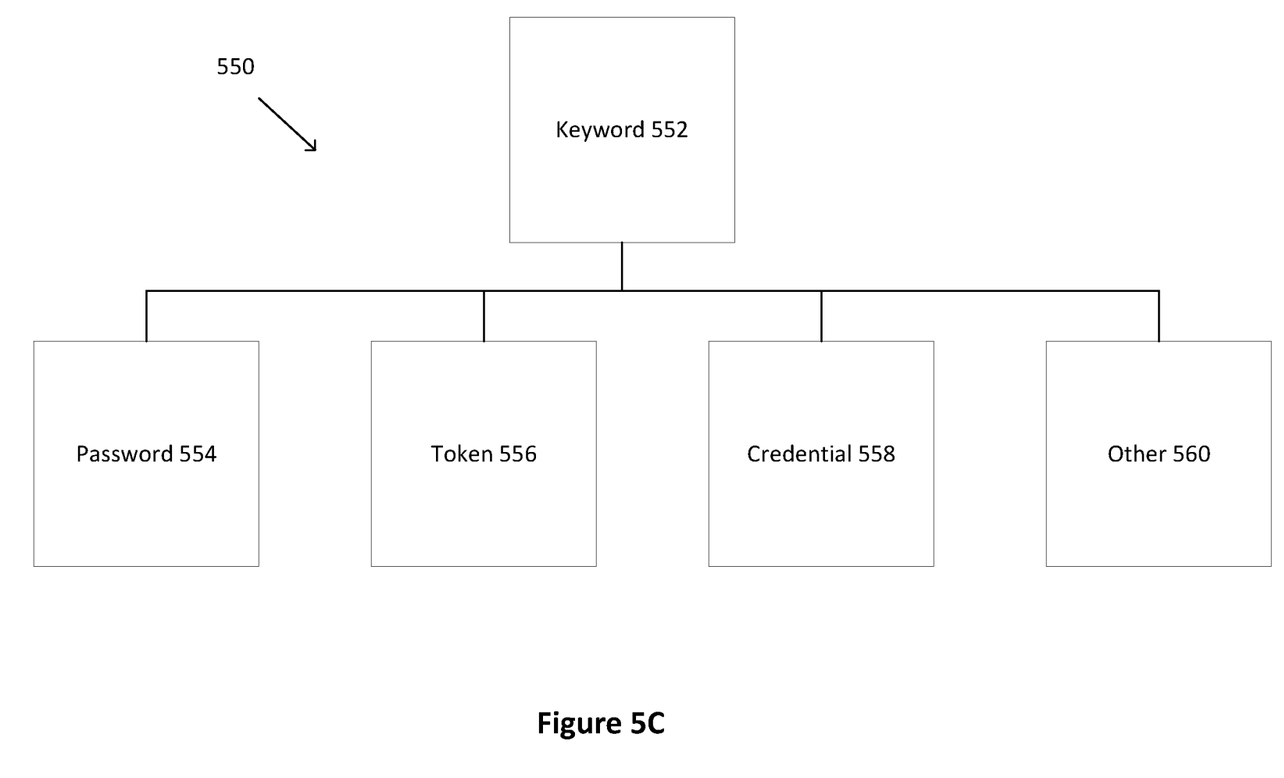
FIG. 5C depicts a chart showing some types of keyword of interest.

As was mentioned above, the aim of the scan of the programming code script is to identify keywords and related words that potentially identify sensitive information that should not be publicly exposed or only exposed to a set of parties with proper authorization. FIG. 5C shows a diagram 550 depicting some examples of possible keywords 552. An example of a keyword is "password" 554 or variants thereof. The presence of that term indicates a likelihood that a password value may follow in the programming code script. A further example of a keyword is "token" 556 or variants thereof indicative of a digital token. Another example of a keyword is "credential" 558. Other keywords 560 may be used, especially in different contexts. For instance, suppose the programming code script relates to financial information, healthcare information or information requiring a security clearance. In such instances, different keywords may be used but the techniques described herein may be applicable.

Figure 6:
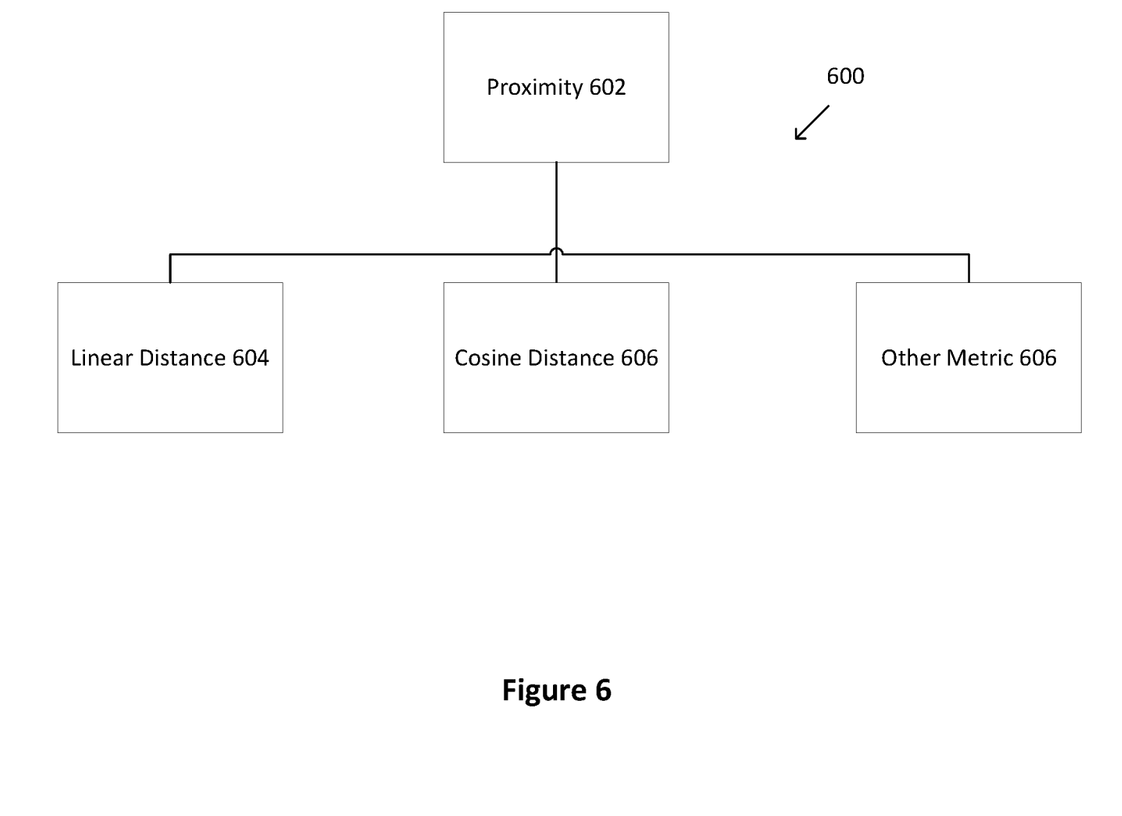
FIG. 6 depicts a diagram illustrating some metrics of distance that may be used.

The above discussion has focused on word embeddings and proximity. As was mentioned above, a number of different metrics may be used to calculate proximity. FIG. 6 depicts a diagram 600 identifying some types of proximity 602 that may be measured in exemplary embodiments. Perhaps the most intuitive way to measure proximity is to calculate linear distance 604. This may be calculated by determining the magnitude of a line that extends from one vector of a word embedding in the vector space to another vector of another word embedding. Another option is to calculate the cosine distance 606 between vectors of two word embeddings and using the cosine as the distance metric for proximity. The cosine distance between vectors {a,b,c} and {x,y,z} is $$1 - \frac{ax + by + cz}{\sqrt{\text{Abs}[a]^2 + \text{Abs}[b]^2 + \text{Abs}[c]^2} \sqrt{\text{Abs}[x]^2 + \text{Abs}[y]^2 + \text{Abs}[z]^2}}.$$

Other metrics 608 of proximity may be used as well.

Figure 7:
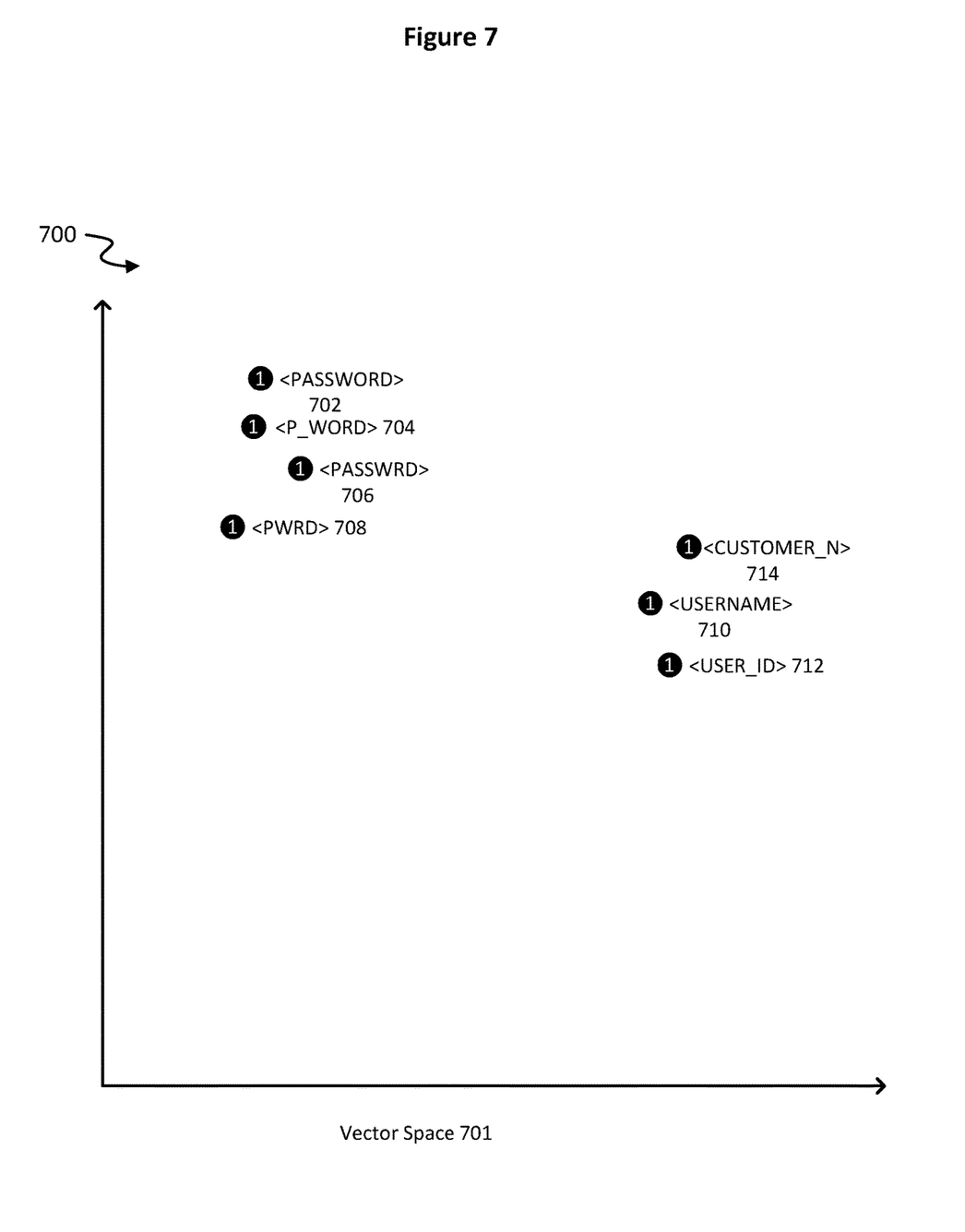
FIG. 7 depicts an illustrative vector space having word embeddings.

FIG. 7 gives an example of keyword word embeddings and related word embeddings in a vector/matrix space. In the plot 700 of Figure representing the vector/matrix space 701 of the word embeddings, there is a word embedding for <PASSWORD> 702. The word embeddings for related terms are in proximity to the word embedding for <PASSWORD> 702. For instance, the word embeddings for <PWORD> 704, for <PASSWRD> 706 and <PWRD> 708 are all in proximity to the word embedding for <PASSWORD> 702. The clustering of word embeddings for related words also appears with the word embedding for <USERNAME> 710. Word embeddings for the related terms <USER_ID> 712 and <CUSTOMER_N> 714 are located in proximity.

Figure 8:
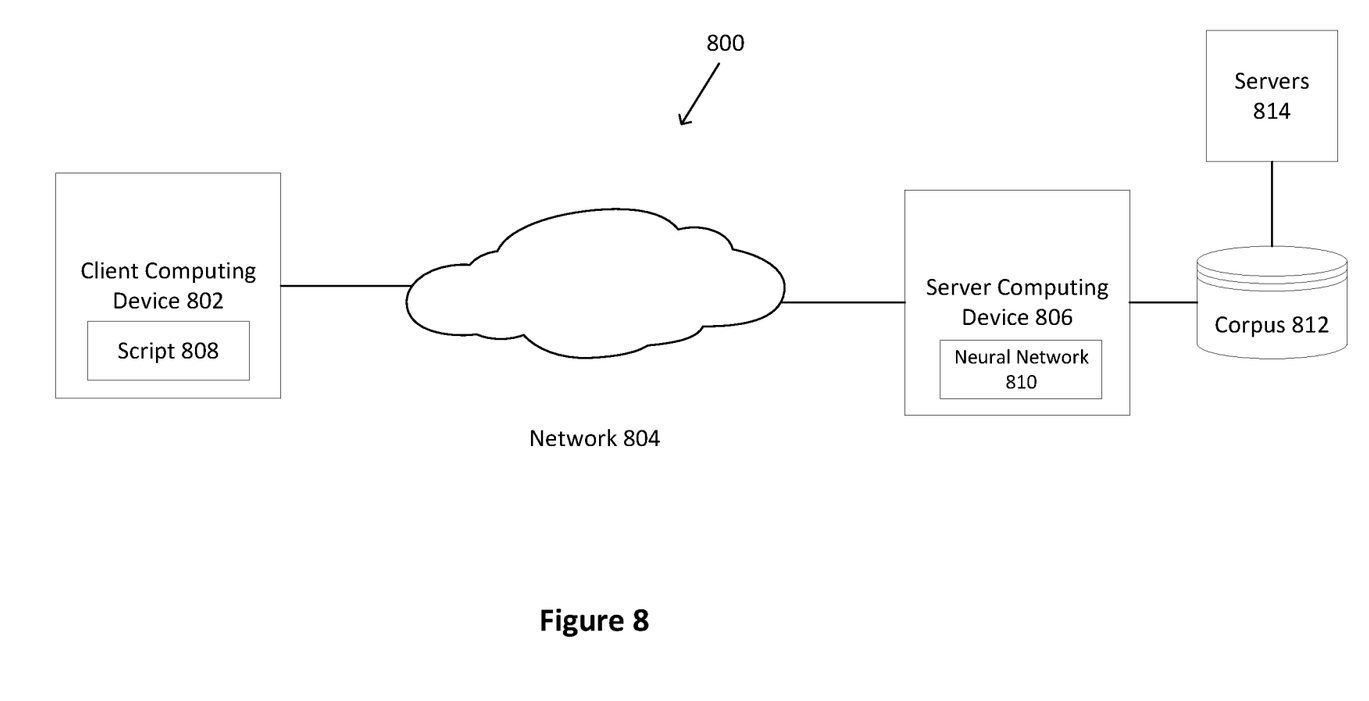
FIG. 8 depicts an environment suitable for practicing an exemplary embodiment.

FIG. 8 depicts an illustrative distributed environment 800 that may be suitable for practicing an exemplary embodiment. A client computing device 802 may be provided for submitting a computer programming script 808 for processing. The client computer device 802 may be a desktop computer, a laptop computer, a workstation, a smartphone or other variety of computing device that can provide the functionality described herein. The client computing device 802 may be interfaced with a network 804. The network 804 may include a wireless network, a wired network, a local area network, a wise area network, the Internet and/or other variety of network. A server computing device 806 in interfaced with the network. The server computing device 806 may be a server computer, a desktop computer, a laptop computer, a mini-computer, a mainframe computer or other type of computing. A neural network 810 for performing the functionality described above may be run on the server computing device 806. Alternatively, the neural network 810 may run on a separate computing resources that are accessible by the server computing device 806. The client computing device 802 may submit one or more computer programming scripts 808 to the server computing device 806 for processing by the neural network 810 as described above. The neural network 810 has been trained on corpus 812 that has been gathered from other servers 812.

Figure 9:
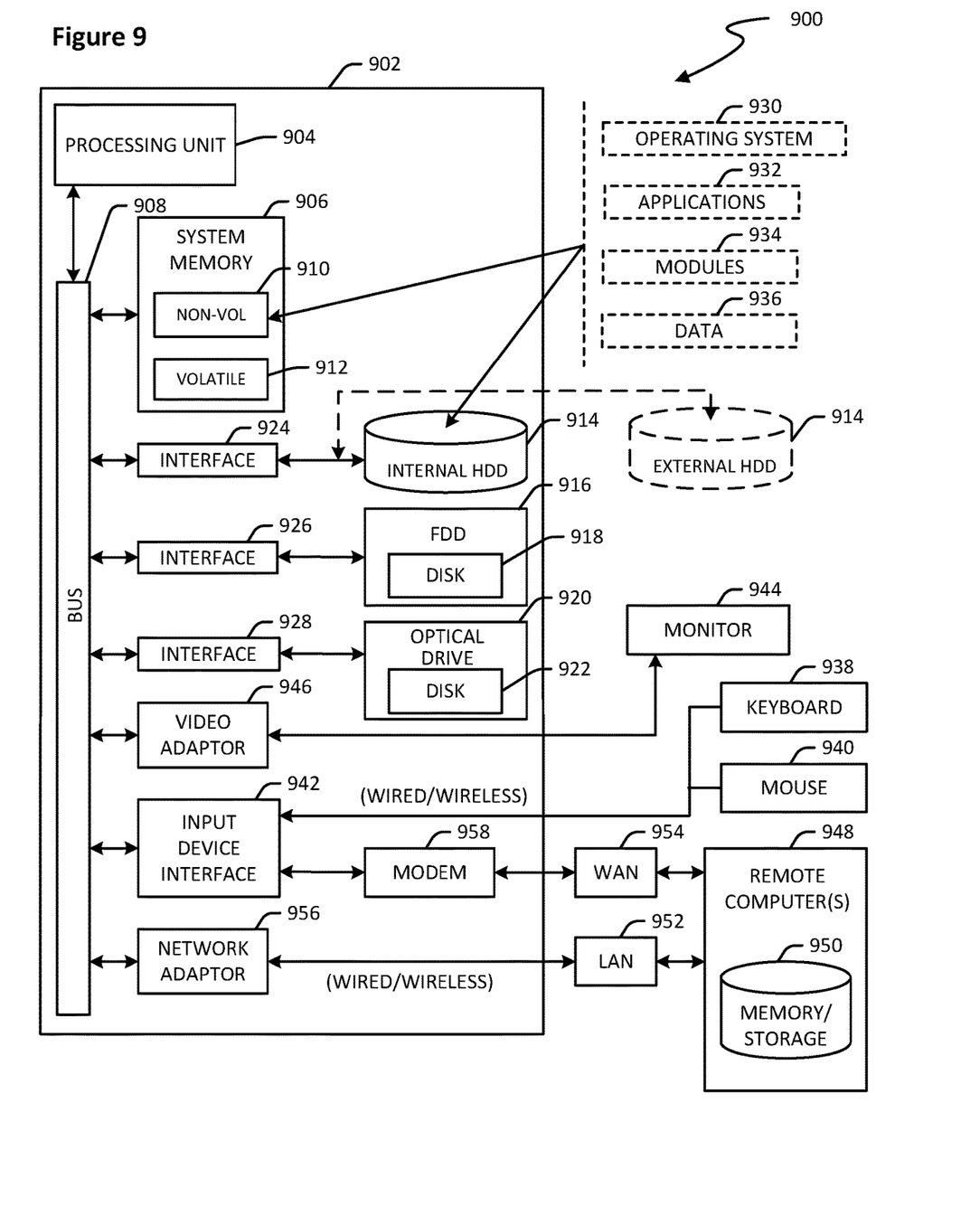
FIG. 9 depicts an illustrative computing device for practicing an exemplary embodiment.

FIG. 9 depicts a computing environment suitable for practicing an exemplary embodiment. The methods described herein may be performed by a computing environment 900, such as that depicted in FIG. 9. FIG. 9 illustrates an embodiment of an exemplary computing environment 900 that includes a computing device 902 that may be suitable for implementing various embodiments as previously described. The computing device 902 may be, for instance a standalone computing device, a client computing device like 802 or a server computing device like 806 in various embodiments. The computing environment 900 may comprise or be implemented as part of an electronic device. More generally, the computing environment 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing environment 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing device 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing device 902.

As shown in FIG. 9, the computing device 902 includes a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multiprocessor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAIVI), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing device 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by an HDD interface 924, an FDD interface 926 and an optical drive interface 928, respectively. The HDD interface 924 for external drive implementations can include at least one or both of Universal Serial Bus (USB) and IEEE 1394 interface technologies. The computing device 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system, including the neural network 810.

A user can enter commands and information into the computing device 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908 but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing device 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing device 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing device 902 can include a modem 958, or is connected to a communications server on the WAN 954 or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing device 902, or portions thereof, can be stored in the remote memory/storage device 950. It will be appreciated that the network connections shown are exemplary and other means of establishing a communications link between the computers can be used.

The computing device 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While the present invention has been described with reference to exemplary embodiments, it should be appreciated that various changes in form and detail may be made without departing from the intended scope of the present invention as defined in the appended claims.

The invention claimed is:

1. A computer-implemented method, comprising:
   training a neural network on a corpus of content, wherein the training results in word embeddings for words in the corpus, wherein each of the word embeddings is a numeric vector in a vector or matrix space;
identifying an initial word of interest;
locating a vector that encodes the initial word of interest in the vector or matrix space;
identifying vectors in the vector or matrix space that lie in a specified proximity to the vector for the initial word of interest and identifying words encoded by the identified vectors as additional words of interest, wherein the identifying comprises one of calculating distances between the vector of the initial word of interest and vectors for other encoded words in the vector or matrix space or calculating cosine values between the vector of the initial word of interest and the vectors for the other encoded words in the vector or matrix space and identifying ones of the vectors in the vector or matrix space that have distances or cosine values within a specified range as being in the specified proximity;
performing a security scan of a set of input to identify instances of the initial word of interest and instances of the additional words of interest in the input; and
generating output that specifies the identified instances of the initial word of interest in the set of input and that specifies that the instances of the additional words of interest in the set of input may be of interest.

2. The method of claim 1, wherein the initial word of interest relates to sensitive content whose access is limited to authorized parties.

3. The method of claim 2, wherein the initial word of interest relates to one of a password, token or credential.

4. The method of claim 1, wherein the corpus contains content stored in multiple code repositories.

5. The method of claim 1, wherein the output includes a ranked probability that the initial word of interest and additional words of interest instances relate to sensitive information.

6. The method of claim 1, wherein the output produces ranked probabilities that the additional words of interest relate to sensitive content.

7. The method of claim 1, wherein the performing a security scan is performed by the neural network.

8. A computer-implemented method, comprising:
training a neural network on a corpus of content, wherein the training results in word embeddings for words in the corpus, wherein each of the word embeddings is a numeric vector in a vector or matrix space;
processing with the neural network a selected input to the trained neural network by:
identifying a word embedding in the vector or matrix space for a word that is indicative of a password being in the input;
calculating distance metrics for distances between the identified word embedding and word embeddings having vectors in proximity to the identified word embedding,
wherein the word embeddings having vectors in proximity to the identified word embedding are word embeddings for which the calculated distance metrics fall within a specified range;
based on the calculated distance metrics, generating a probability for each of multiple words having word embeddings in proximity to the identified word embedding, the probability being a probability that the word is indicative of a password;
identifying a subset of the multiple words that have a probability that exceeds a threshold; and
generating an output that identifies the identified subset.

9. The method of claim 8, wherein the output identifies the words in the subset and provides the generated probability for the words in the subset.

10. The method of claim 8, wherein the input is fed to the neural network a word at a time.

11. The method of claim 8, wherein the input is fed an n-gram at a time where n is an integer greater than or equal to 2.

12. The method of claim 8, wherein the calculating the distance metrics comprises calculating linear distance or calculating cosine distance.

13. A non-transitory computer-readable storage medium storing instructions that cause a processor to perform the following:
input words to a trained neural network;
with the trained neural network, determining word embeddings for the input words, wherein each word embedding is a vector in a vector or matrix space;
computing proximity in the vector or matrix space between the word embeddings of input words and the word embeddings of known words of interest, wherein the computing proximity comprises calculating distances in the vector or matrix space between the input words and the word embeddings of the known words of interest;
based on the computed proximity, determining probabilities for at least some of the input words that the input words are of interest, where the calculated distances for the at least some of the input words are each within a specified range; and
outputting a ranked list of the determined probabilities for at least some of the input words wherein only probabilities over a threshold are output as part of the outputting.

14. The non-transitory computer-readable storage medium of claim 13, wherein the known words of interest relate to confidential subject matter.

15. The non-transitory computer-readable storage medium of claim 14, wherein the known words of interest are at least one of passwords, tokens or credentials.

16. The non-transitory computer-readable storage medium of claim 13, wherein the corpus contains content stored in multiple code repositories.

17. The non-transitory computer-readable storage medium of claim 13, wherein the calculating distances comprises one of calculating cosine distances or calculating linear distances.

18. The non-transitory computer-readable storage medium of claim 13, further storing instructions that cause the processor to train the neural network.

19. The non-transitory computer-readable storage medium of claim 18, wherein to train the neural network, a corpus of content having known words of interest is processed by the neural network.

20. The non-transitory computer-readable storage medium of claim 13, wherein the probabilities for the input words increase as the calculated distances decrease.

* * * * *